(12) United States Patent
Chen et al.

(10) Patent No.: US 11,863,612 B2
(45) Date of Patent: Jan. 2, 2024

(54) NETWORK EDGE COMPUTING AND NETWORK EDGE COMPUTATION SCHEDULING METHOD, DEVICE AND MEDIUM

(71) Applicant: GUIZHOU BAISHANCLOUD TECHNOLOGY CO., LTD., Guiyang (CN)

(72) Inventors: Chuang Chen, Guiyang (CN); Hui Miao, Guiyang (CN)

(73) Assignee: GUIZHOU BAISHANCLOUD TECHNOLOGY CO., LTD., Guiyang (CN)

( * ) Notice: Subject to any disclaimer, the term of this patent is extended or adjusted under 35 U.S.C. 154(b) by 0 days.

(21) Appl. No.: 17/761,688

(22) PCT Filed: Aug. 26, 2020

(86) PCT No.: PCT/CN2020/111455
§ 371 (c)(1),
(2) Date: Mar. 18, 2022

(87) PCT Pub. No.: WO2021/052129
PCT Pub. Date: Mar. 25, 2021

(65) Prior Publication Data
US 2022/0345521 A1  Oct. 27, 2022

(30) Foreign Application Priority Data
Sep. 19, 2019 (CN) .......................... 201910885817.4

(51) Int. Cl.
*H04L 67/1004* (2022.01)
*H04L 61/2517* (2022.01)
(Continued)

(52) U.S. Cl.
CPC ...... *H04L 67/1004* (2013.01); *H04L 61/2517* (2013.01); *H04L 67/02* (2013.01); *H04L 2101/69* (2022.05)

(58) Field of Classification Search
CPC .. H04L 67/1004; H04L 61/2517; H04L 67/02
See application file for complete search history.

(56) References Cited

U.S. PATENT DOCUMENTS 8,595,262 B1 * 11/2013 Hayden ............... G06F 16/2471
370/254
10,057,412 B1 * 8/2018 Salour ..................... H04M 3/54
(Continued)

FOREIGN PATENT DOCUMENTS

CN         102148752 A      8/2011
CN         106020930 A      10/2016
(Continued)

OTHER PUBLICATIONS

The World Intellectual Property Organization (WIPO) International Search Report for PCT /CN2020/111455 dated Nov. 26, 2020 7 Pages(with translation).
(Continued)

*Primary Examiner* — Jimmy H Tran
(74) *Attorney, Agent, or Firm* — ANOVA LAW GROUP, PLLC (57) ABSTRACT

A network edge computing method includes receiving, by an edge data node, a service request at least processed by network edge computation scheduling; and routing, according to a service port involved in the service request, the service request to a container of the edge data node, to be processed by the container.

12 Claims, 8 Drawing Sheets

(51) Int. Cl.
  *H04L 67/02*  (2022.01)
  *H04L 101/69*  (2022.01)

(56) References Cited

U.S. PATENT DOCUMENTS

| | | | | |
|---|---|---|---|---|
| 10,362,110 | B1* | 7/2019 | Matylitski | H04L 67/60 |
| 10,505,798 | B2 | 12/2019 | Zhang et al. | |
| 10,534,629 | B1* | 1/2020 | St. Pierre | G06F 9/5055 |
| 10,616,179 | B1* | 4/2020 | McCarriar | H04L 61/2514 |
| 10,673,716 | B1* | 6/2020 | Sethuramalingam | G06F 16/9024 |
| 10,791,168 | B1* | 9/2020 | Dilley | H04L 67/288 |
| 11,201,915 | B1* | 12/2021 | Mesard | H04L 67/1031 |
| 11,281,492 | B1* | 3/2022 | Rebeja | G06F 9/5077 |
| 11,457,080 | B1* | 9/2022 | Meduri | H04L 67/60 |
| 11,470,535 | B1* | 10/2022 | Thomason | H04W 84/18 |
| 2002/0178214 | A1* | 11/2002 | Brittenham | H04L 67/1012 709/203 |
| 2010/0228819 | A1* | 9/2010 | Wei | H04L 67/1001 718/1 |
| 2014/0098673 | A1* | 4/2014 | Lee | H04L 41/122 370/255 |
| 2014/0280433 | A1* | 9/2014 | Messerli | H04L 67/10 709/201 |
| 2014/0337507 | A1* | 11/2014 | Manghirmalani | H04L 43/0894 709/224 |
| 2015/0220561 | A1* | 8/2015 | Goetz | G06F 16/00 707/827 |
| 2015/0281111 | A1* | 10/2015 | Carl | H04L 47/70 709/226 |
| 2015/0304209 | A1* | 10/2015 | Choudhury | H04L 45/02 370/255 |
| 2015/0317169 | A1* | 11/2015 | Sinha | G06F 9/4416 713/2 |
| 2015/0381515 | A1* | 12/2015 | Mattson | H04L 47/70 707/722 |
| 2016/0072727 | A1* | 3/2016 | Leafe | H04L 47/781 709/226 |
| 2016/0188621 | A1* | 6/2016 | Karinta | G06F 16/183 707/827 |
| 2016/0212012 | A1* | 7/2016 | Young | G06F 21/50 |
| 2016/0301603 | A1* | 10/2016 | Park | H04L 49/3063 |
| 2016/0373373 | A1* | 12/2016 | Das | H04L 67/1008 |
| 2017/0034012 | A1* | 2/2017 | Douglas | H04L 41/0806 |
| 2017/0060708 | A1* | 3/2017 | Narang | G06F 11/2033 |
| 2017/0063614 | A1* | 3/2017 | Hartwig | H04L 41/0883 |
| 2017/0064005 | A1* | 3/2017 | Lee | H04L 67/141 |
| 2017/0134520 | A1* | 5/2017 | Abbasi | H04L 47/70 |
| 2017/0163724 | A1* | 6/2017 | Puri | G06F 9/5083 |
| 2017/0195306 | A1* | 7/2017 | Ishaya | H04L 63/0876 |
| 2017/0223117 | A1* | 8/2017 | Messerli | H04L 47/783 |
| 2018/0062942 | A1* | 3/2018 | Walsh | H04L 41/5009 |
| 2018/0359218 | A1* | 12/2018 | Church | H04L 43/062 |
| 2019/0005576 | A1* | 1/2019 | Mick | H04L 41/5054 |
| 2019/0158455 | A1* | 5/2019 | Hegde | H04L 61/5076 |
| 2019/0179678 | A1* | 6/2019 | Banerjee | G06F 9/5055 |
| 2019/0243438 | A1* | 8/2019 | Park | H04L 43/08 |
| 2019/0253274 | A1* | 8/2019 | Van Dussen | H04L 12/4641 |
| 2019/0306231 | A1* | 10/2019 | Shimoga Manjunatha | H04L 61/255 |
| 2020/0036638 | A1* | 1/2020 | Li | H04L 47/125 |
| 2020/0097339 | A1* | 3/2020 | Carlen | H04L 69/40 |
| 2020/0106737 | A1* | 4/2020 | Beedu | H04L 61/2517 |
| 2020/0110625 | A1* | 4/2020 | Warnicke | H04L 67/1021 |
| 2020/0119981 | A1* | 4/2020 | Guthrie | H04L 63/0428 |
| 2020/0137185 | A1* | 4/2020 | Parekh | G06F 9/5061 |
| 2020/0162330 | A1* | 5/2020 | Vadapalli | H04L 63/0892 |
| 2020/0169534 | A1* | 5/2020 | Fritz | H04L 63/0272 |
| 2020/0204449 | A1* | 6/2020 | Bitterfeld | G06F 16/27 |
| 2020/0322226 | A1* | 10/2020 | Mishra | H04L 43/067 |
| 2021/0014274 | A1* | 1/2021 | Monni | H04L 63/20 |
| 2021/0026692 | A1* | 1/2021 | Mestery | H04L 61/4511 |
| 2021/0072966 | A1* | 3/2021 | Zong | H04L 67/60 |
| 2021/0144517 | A1* | 5/2021 | Guim Bernat | H04L 67/10 |
| 2021/0336839 | A1* | 10/2021 | He | H04L 41/18 |
| 2022/0038530 | A1* | 2/2022 | Amento | H04L 67/1008 |
| 2022/0086195 | A1* | 3/2022 | Amento | H04L 65/61 |
| 2022/0182298 | A1* | 6/2022 | Degioanni | H04L 41/0886 |
| 2022/0210203 | A1* | 6/2022 | Crabtree | H04L 63/1425 |
| 2022/0400130 | A1* | 12/2022 | Kapoor | G06F 16/9537 |
| 2023/0214208 | A1* | 7/2023 | A | G06F 8/65 709/220 |

FOREIGN PATENT DOCUMENTS

| | | |
|---|---|---|
| CN | 107003985 A | 8/2017 |
| CN | 108551488 A | 9/2018 |
| CN | 109032755 A | 12/2018 |
| CN | 109067890 A | 12/2018 |
| CN | 109582441 A | 4/2019 |
| CN | 109640319 A | 4/2019 |
| CN | 109725949 A | 5/2019 |
| CN | 109802934 A | 5/2019 |
| CN | 110166409 A | 8/2019 |
| EP | 3462311 A1 | 4/2019 |

OTHER PUBLICATIONS

The State Intellectual Property Office of People's Republic of China The First Office Action for CN 201910885817.4 dated Aug. 25, 2021 17 pages (with translation).
CMCC. "Use Case of Edge Computing and Radio Network Exposure", 3GPP TSG RAN WG3 #101BIS R3-186040, Oct. 12, 2018.
The State Intellectual Property Office of People's Republic of China The First Office Action for CN 201910925807.9, dated Jan. 10, 2022 17 pages (with translation).
The State Intellectual Property Office of People's Republic of China The Second Office Action for CN 201910925807.9 dated Sep. 5, 2022 22 pages (with translation).

* cited by examiner

NETWORK EDGE COMPUTING AND NETWORK EDGE COMPUTATION SCHEDULING METHOD, DEVICE AND MEDIUM

CROSS-REFERENCE TO RELATED APPLICATIONS

The present application is a national stage entry under 35 U.S.C. § 371 of International Application No. PCT/CN2020/111455, filed on Aug. 26, 2020, which claims priority to Chinese Patent Application No. 201910885817.4, titled "NETWORK EDGE COMPUTING METHOD, NETWORK EDGE COMPUTING APPARATUS, DEVICE AND MEDIUM," filed to the State Intellectual Property Office of People's Republic of China on Sep. 19, 2019, which are incorporated herein by reference in their entirety.

TECHNICAL FIELD

The present disclosure relates to, but is not limited to, an edge computing technology, and in particular to a network edge computing method, apparatus, device and medium.

BACKGROUND

Using the edge computing technology in a distributed content delivery network can realize most user data operation and data control sinking to the local device closest to the user without relying on the cloud. This undoubtedly greatly improves the efficiency of data processing and reduces the load of the cloud and the central database. However, new problems have arisen. There are a large number of node servers in a distributed content delivery network, it needs to meet a variety of single or integrated services such as caching, scheduling, computing, monitoring, storage and so on. Then, how to provide the edge computing service quickly and efficiently in large-scale complex server clusters has become a key issue.

SUMMARY

In order to overcome the problems in related technologies, the present disclosure provides a network edge computing method, apparatus, device and medium.

According to a first aspect of the present disclosure, a network edge computing method is provided, comprising:
  receiving, by an edge data node, a service request; and
  routing, according to a service port involved in the service request, the service request to one or more containers of the edge data node, to be processed by the container;
  wherein the service request comprises at least a service request processed by network edge computation scheduling.

In the method, the routing the service request to one or more containers of the edge data node comprises:
  querying a mapping relationship between public ports of the edge data node and service ports to search for a public port corresponding to the service request, and sending the service request to a located public port; and
  after receiving the service request at the public port, routing the service request to one or more containers corresponding to a service according to a load balancing mechanism for the edge data node.

In the method, the service request comprises at least any one or more of:
  an HTTP request, an HTTPS request, a Websocket request, an FTP request, an SMTP request.

According to another aspect of the present disclosure, a network edge computation scheduling method is provided, comprising:
  determining edge data node information of an edge data node corresponding to an initiator of a service request according to a received service request; and
  returning the determined edge data node information to the initiator of the service request, to instruct the initiator of the service request to send a service request to the edge data node corresponding to the edge data node information.

In the method, the determining edge data node information of the edge data node corresponding to an initiator of a service request according to a received service request comprises:
  determining the edge data node information of the edge data node corresponding to the initiator of the service request, according to a correspondence between domain names and information about edge data nodes deployed with a service, and according to a geographic location and/or a logical location of the initiator of the service request.

In the method, the service request comprises at least any one or more of:
  an HTTP request, an HTTPS request, a Websocket request, an FTP request, an SMTP request.

According to still another aspect of the present disclosure, a network edge computing apparatus is provided, comprising:
  a first module, configured to receive a service request, the service request comprising at least a service request processed by network edge computation scheduling; and
  a second module, configured to route, according to a service port involved in the service request, the service request to one or more containers of an edge data node, to be processed by the container.

In the apparatus, the routing, by the second module and according to the service port involved in the service request, the service request to one or more containers of the edge data node comprises:
  querying, according to the service port involved in the service request, a mapping relationship between public ports of the apparatus and service ports to search for a public port corresponding to the service request, and sending the service request to a located public port; and
  after receiving the service request at the public port of any server in the apparatus, routing, according to a load balancing mechanism for a cluster, the service request to one or more containers corresponding to the service.

In the apparatus, the service request comprises at least any one or more of:
  an HTTP request, an HTTPS request, a Websocket request, an FTP request, an SMTP request.

According to yet another aspect of the present disclosure, a network edge computation scheduling apparatus is provided, comprising:
  a first module, configured to determine edge data node information of an edge data node corresponding to an initiator of a service request according to a received service request; and
  a second module configured to return the determined edge data node information to the initiator of the service request, to instruct the initiator of the service request to send a service request to the edge data node corresponding to the edge data node information.

In the apparatus, the determining edge data node information of the edge data node corresponding to an initiator of a service request according to a received service request comprises:

determining the edge data node information of an edge data node corresponding to the initiator of the service request, according to the correspondence between domain names and information about edge data nodes deployed with a service, and according to a geographic location and/or a logical location of the initiator of the service request.

In the apparatus, the service request comprises at least one or more of:

an HTTP request, an HTTPS request, a Websocket request, an FTP request, an SMTP request.

According to another aspect of the present disclosure, there is provided a computer-readable storage medium having a computer program stored thereon that, when executed, implements any one of methods described above.

According to another aspect of the present disclosure, a computer device is provided, comprising a processor, a memory, and a computer program stored on the memory that, when executed by the processor, implements any one of methods described above.

The present disclosure provides a network edge computing method, apparatus, device and medium, which can provide the edge computing service quickly and efficiently in large-scale complex server clusters.

It should be understood that, the aforementioned general description and detailed description hereinafter are merely exemplary and explanatory, and the present disclosure is not limited thereto.

BRIEF DESCRIPTION OF THE DRAWINGS

The accompanying drawings illustrated herein, which constitute part of the present disclosure, are used to provide further understanding of the present disclosure, and exemplary embodiments of the present disclosure and the description thereof are used to explain the present disclosure and not intended to inappropriately limit the present disclosure. In the drawings.

DETAILED DESCRIPTION

The technical solutions in the embodiments of the present disclosure will be described clearly and completely with reference to the accompanying drawings in the embodiments of the present disclosure. Apparently, the embodiments to be described are some embodiments of the present disclosure, rather than all embodiments of the present disclosure. Based on the embodiments of the present disclosure, all other embodiments obtained by a person of ordinary skill in the art without paying any creative effort are included in the protection scope of the present disclosure. It is to be noted that the embodiments of the present disclosure and features in the embodiments may be combined if not conflict.

Embodiment 1

Figure 1:
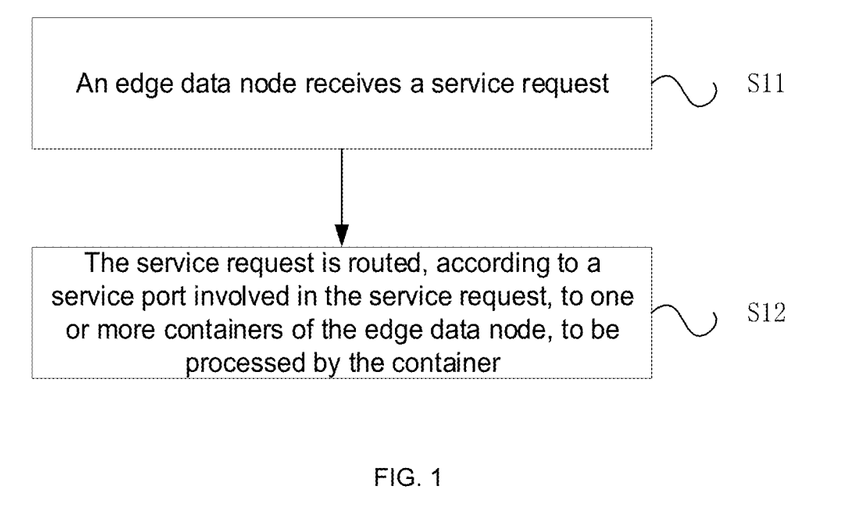
FIG. 1 is a flowchart of a network edge computing method according to an exemplary embodiment.

This embodiment provides a network edge computing method. The implementation process of the method is shown in FIG. 1, and comprises the following operation steps.

S11: An edge data node receives a service request.

In this embodiment, there may be many types of service requests received by the edge data node. For example, the service request may comprise any one or more of an HTTP request, an HTTPS request, a Websocket request, an FTP request, and an SMTP request.

In addition, in the step S11, the source of the service request received by the edge data node may comprise a service request processed by the network edge computation scheduling. For example, a user may obtain edge data node information through network edge computation scheduling, and determine an edge data node that provides the edge computing service according to the obtained edge data node information. In this case, the user may directly send the original service request to the determined edge data node.

S12: The service request is routed, according to a service port involved in the service request, to one or more containers of the edge data node, to be processed by the container.

In actual use, the operation of the step S12 may be divided into the following steps:

S12a: querying a mapping relationship between public ports of the edge data node and service ports to search for a public port corresponding to the received service request, and sending the service request to the located public port;

S12b: after receiving the service request at the public port, routing the service request to one or more containers corresponding to a service according to a load balancing mechanism for the edge data node; and S12c: the container in the edge data node that receives the service request performs corresponding processing operations.

It may be known from the embodiment that the technical solution of the present disclosure provides the edge computing service on the edge data node in unit of containers. That is, when a service request is received, it is just needed to route the edge computing service to the container that provides the edge computing service. Because the container may generally be created on the server of the edge computing node. Therefore, when any server fails, it is only necessary to migrate the container on the server to other servers that operate normally, and the corresponding edge computing service can still be provided, without causing the interruption of the service. In addition, in this embodiment, there may be multiple containers that provide the edge computing service in an edge computing node, which is equivalent to providing the edge computing service in a multiple backup manner. In this way, when any container that provides the edge computing service is overloaded or fails, the corresponding edge computing service can still be provided by other backup containers, thereby ensuring the reliability of the edge computing service.

Embodiment 2

Figure 2:
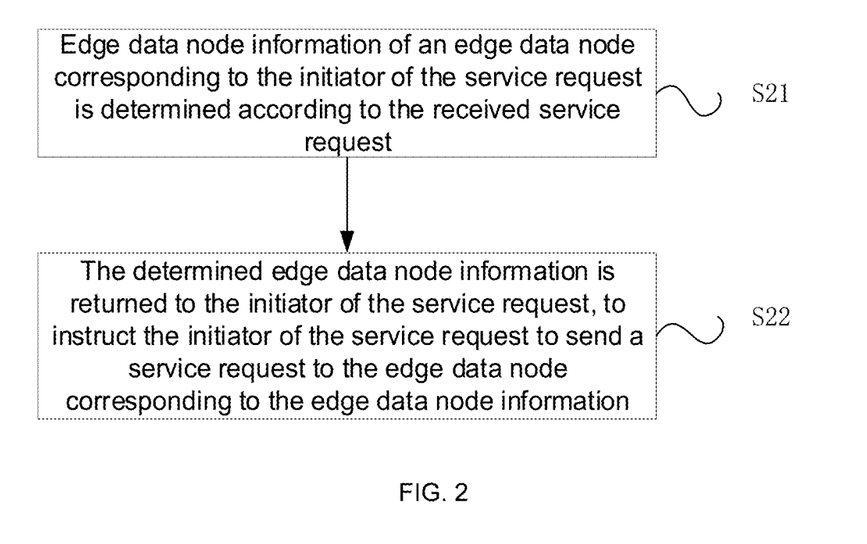
FIG. 2 is a flowchart of a network edge scheduling method according to an exemplary embodiment.

This embodiment provides a network edge computation scheduling method. The method may be executed by multiple devices. The device may be any network element device with a scheduling function in the network edge computation, for example, a network edge computation management device, etc. The device may be a third-party device certified or trusted by the network edge computing service, for example DNS, etc. The implementation of this method is shown in FIG. 2, comprising the following steps.

S21: Edge data node information of an edge data node corresponding to the initiator of the service request is determined according to the received service request.

The received service request may be any one or more of an HTTP request, an HTTPS request, a Websocket request, an FTP requests and an SMTP request.

S22: The determined edge data node information is returned to the initiator of the service request, to instruct the initiator of the service request to send a service request to the edge data node corresponding to the edge data node information.

In the step S21, when determining edge data node information of an edge data node corresponding to the initiator of the service request, edge data node information of an edge data node corresponding to the initiator of the service request may be determined according to the pre-obtained correspondence between domain names and information about edge data nodes deployed with a service and according to geographic location and/or logical location of the initiator of the service request. There may be many ways to obtain the correspondence between domain names and information about edge data nodes deployed with a service in advance. For example, the correspondence may be received in advance by the edge data node from the management center for the edge computing service or other network element devices. The correspondence may also be obtained by the edge data node from the local configuration data. It is not specifically limited in this embodiment.

The following takes geographic location or logical location as an example to introduce the process of determining the edge data node information of the edge data node corresponding to the initiator of the service request. This process may comprise following steps:

S21a: searching, according to the pre-obtained correspondence between the domain names and information about the edge data nodes deployed with the service, the edge data node information deployed with the service, which is corresponding to the domain name of the received service request;

S21b: determining whether the found edge data node information uniquely identifies an edge data node, and if the found edge data node information uniquely identifies an edge data node, determining the found edge data node information as the edge data node information of the edge data node corresponding to the initiator of the service request and ending this process, otherwise executing step S21c; and S21c: when the found edge data node information identifies multiple edge data nodes, searching again, from these multiple edge data nodes, an edge data node whose geographic location or logical location is closest to the location of the initiator of the service request, and determining the edge data node information of the edge data node found again as the edge data node information of the edge data node corresponding to the initiator of the service request.

In this embodiment, the edge data node whose geographic location or logical location is closest to the location of the initiator of the service request is taken as an example. In practical disclosures, it is also possible to search an edge data node whose geographic location and logical location are both closest to the location of the initiator of the service request.

In the present disclosure, the edge data node whose logical location is closest to the location of the initiator of the service request may comprise the edge data node of the same operator as the initiator of the service request and/or the edge data node with the minimum data transmission delay. For example, the operator to which the initiator of the service request belongs may be determined, and an edge data node belonging to the operator may be selected as the edge data node whose logical location is closest to the location of the initiator of the service request. It is also possible to determine the edge data node with the minimum data transmission delay as the edge data node whose logical location is closest to the location of the initiator of the service request. The edge data node with the minimum data transmission delay among the edge data nodes under the operator to which the initiator of the service request belongs may be also determined as the edge data node whose logical location is closest to the location of the initiator of the service request. The data transmission delay comprises node processing delay, queuing delay, sending delay, propagation delay, etc.

It may be known from the embodiment that the technical solution of the present disclosure can perform network edge computation scheduling on the received service request, that is, route the service request to the edge data node that provides the edge computing service for processing. In this way, for the initiator of the service request, an edge data node can be quickly found for edge computation, and the processing efficiency of the service request can be improved.

Embodiment 3

This embodiment provides a network edge computing apparatus, for example an edge data node device, comprising at least a first module and a second module.

The first module is configured to receive a service request, the service request comprising at least a service request processed by network edge computation scheduling.

In this embodiment, the service request may be any one or more of an HTTP request, an HTTPS request, a Websocket request, an FTP request and an SMTP request.

The second module is configured to route, according to a service port involved in the service request, the service request to one or more containers of an edge data node, to be processed by the container.

The second module may query, according to a service port involved in the received service request, a mapping relationship between public ports of the apparatus and service ports to search for a public port corresponding to the service request, and send the service request to the located public port. In this case, after receiving the service request at the public port of any server in the apparatus, the service request may be routed to one or more containers corresponding to the service according to a load balancing mechanism for a cluster.

The apparatus in this embodiment can implement the network edge computing method introduced in the Embodiment 1. Therefore, for detailed description of modules in the apparatus, please refer to the corresponding content of Embodiment 1. They will not be repeated here.

Embodiment 4

This embodiment provides a network edge computation scheduling apparatus, for example, a network edge computation scheduling device, a network edge computation management device, a DNS device, etc. The network edge computation scheduling apparatus comprises at least a first module and a second module.

The first module is configured to determine edge data node information of an edge data node corresponding to the initiator of the service request according to the received service request.

In this embodiment, the service request may be any one or more of an HTTP request, an HTTPS request, a Websocket request, an FTP request and an SMTP request.

The second module is configured to return the determined edge data node information to the initiator of the service request, to instruct the initiator of the service request to send a service request to the edge data node corresponding to the edge data node information.

Specifically, the second module may determine the edge data node information of the edge data node corresponding to the initiator of the service request in the following way:
  determining edge data node information of an edge data node corresponding to the initiator of the service request, according to the correspondence between domain names and information about edge data nodes deployed with a service, and according to geographic location and/or logical location of the initiator of the service request.

The apparatus in this embodiment can implement the network edge computing method introduced in the Embodiment 1. Therefore, for detailed description of modules in the apparatus, please refer to the corresponding content of Embodiment 1. They will not be repeated here.

The methods of Embodiments 1 and 2 may be used separately or in combination. Similarly, the apparatuses of Embodiments 3 and 4 may be used separately or in combination.

Embodiment 5

Figure 3:
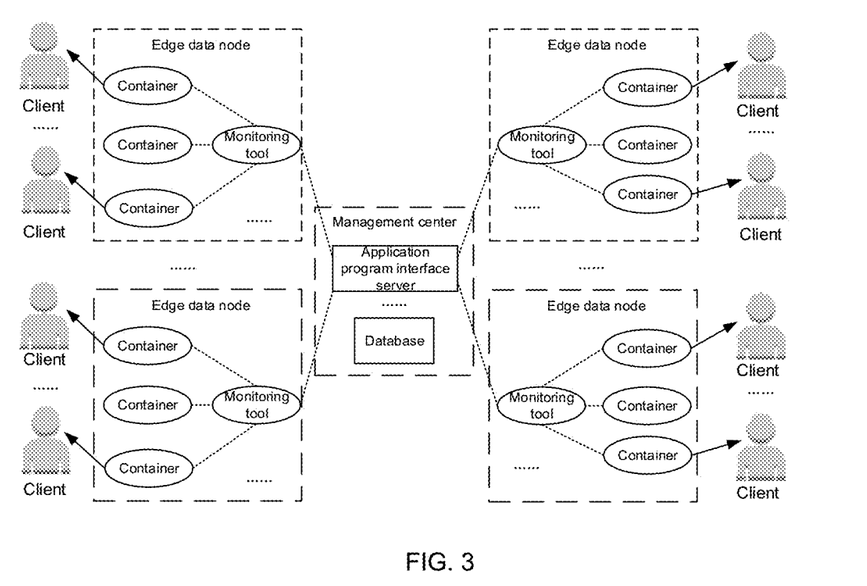
FIG. 3 is a schematic diagram of a network architecture for implementing edge computation according to an exemplary embodiment.

In this embodiment, an edge computing network architecture shown in FIG. 3 is taken as an example to illustrate a specific implementation of the foregoing embodiments.

It may be known from FIG. 3 that the overall architecture for edge computing comprises at least two parts: a management center and edge data nodes.

The management center is configured to control and manage all edge data nodes, send create and manage commands to the edge data nodes, and collect information reported by the edge data nodes.

The edge data nodes (or called edge computer rooms) are configured to process requests from users. Each edge data node may, which may be considered as a self-managed cluster, perform load balancing processing on the received requests from users, and horizontally expand and automatically migrate the containers of this edge data node, thereby providing high availability.

The containers involved in the present disclosure may include, but are not limited to, docker containers.

Figure 4:
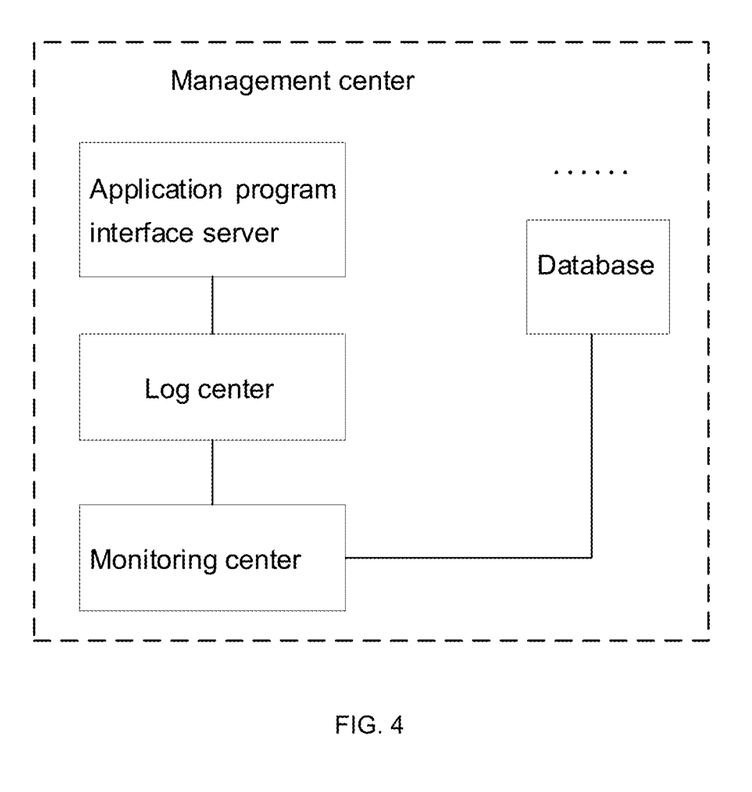
FIG. 4 is a schematic structure diagram of a management center in the network architecture of FIG. 3.

In the network architecture shown in FIG. 3, the management center for the network edge computation is equivalent to the network edge computation scheduling apparatus in Embodiment 2, and its structure is shown in FIG. 4. The management center may comprise the following components:

Application program interface server (which integrates all the functions of the first module and the second module involved in Embodiment 2): mainly configured to receive a service deploy request for edge data nodes, determine to create a corresponding container on a node specified by a service provider that initiates the service deploy request according to the configuration information involved in the received service deploy request and the server information of each node stored in the database, and send a corresponding operation command to a cluster management module of the edge data node, the operation command instructing the cluster management module of the edge data node to perform any one or more of operations such as creation, destruction, capacity expansion, and migration of local containers, etc.

Log center: configured to collect log data from users, and store the log data after processing, so that the users can view the log data in the future, analyze the user logs, mine abnormal data, and give warnings to special logs.

Monitoring center: configured to send a monitoring request to a cluster monitoring tool of an edge data node, wherein the monitoring request may be used to collect the container state information and server state information in the cluster of edge data nodes. The monitoring request may be sent periodically to the cluster monitoring tool of each edge data node. The container state information may comprise the occupancy ratio of the container (for example, the container memory, CPU, and network usage), etc. The server state information may comprise the state of the server in running the loads, etc.

Database: mainly configured to store user information, cluster information, server information on edge data nodes, etc. The user information comprises at least the user identification (for example, user IP, etc.). The cluster information comprises at least the state of the cluster, the number of tasks running in the cluster, etc. The server information on the edge data node comprises at least the machine identification (i.e., server identification), machine load (server load) state, etc.

Figure 5:
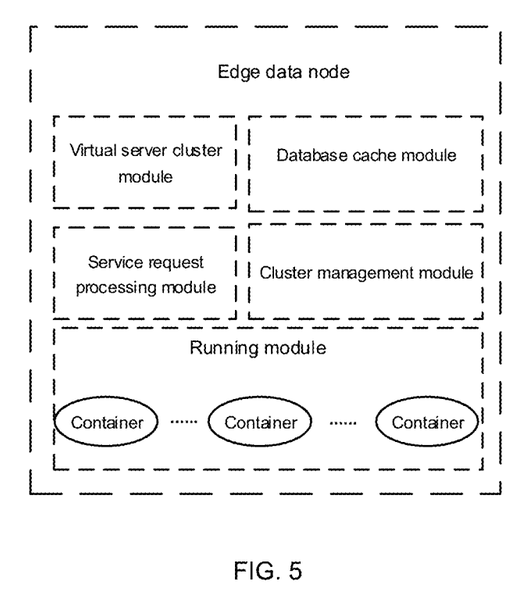
FIG. 5 is a schematic structure diagram of an edge data node in the network architecture of FIG. 3.

In the network architecture shown in FIG. 3, the edge data node is equivalent to the network edge computing apparatus in Embodiment 1, and the structure of the apparatus is shown in FIG. 5. The edge data node may comprise the following components. The cluster management module, the database cache module, the virtual server cluster module, and the service request processing module all adopt redundant design to avoid the single point problems.

Cluster management module (which integrates all the functions of the first module and the second module involved in Embodiment 1): which is responsible for the creation, deletion, and migration of containers in the node according to the operation command issued by the management center, manages servers in the node, and collects the server state information in this node and reports it to the management center.

Figure 6:
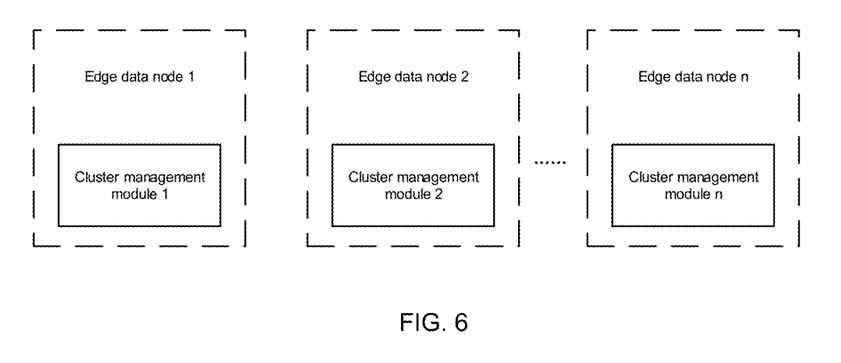
FIG. 6 is a schematic principle diagram of cluster management among multiple edge data nodes in the network architecture of FIG. 3.

In the present disclosure, the cluster management modules for different nodes may be independent of each other, and each node is a self-managed cluster, as shown in FIG. 6. In this way, finer control granularity is ensured, and there is no need to maintain complex relationships through tags. For example, the container in each node is managed by only the cluster management module in the node, so there is no need to store the correspondence between the node and the container. Similarly, the node server in each node is only managed by the cluster management module in the node, and there is no need to mark and store the association between the node and the node server. Of course, multiple nodes may be coordinated for autonomous management.

The method of constructing clusters in units of nodes so that the cluster management modules for different nodes are not related to each other can further detect the survival state of containers and servers more accurately. This is because all computer rooms use one cluster. After the cluster management module is deployed in the central node, the network environments from the central node to the edge computer rooms vary. It is very possible to misjudge the survival state of containers and nodes, leading to wrong migration. Limiting the cluster system to one node for management also has the following beneficial effect: since, after a server is associated with a public port, all servers need to listen to the public port, unnecessary nodes are prevented from listening to the server at the public port after constructing different clusters according to different nodes.

Figure 7:
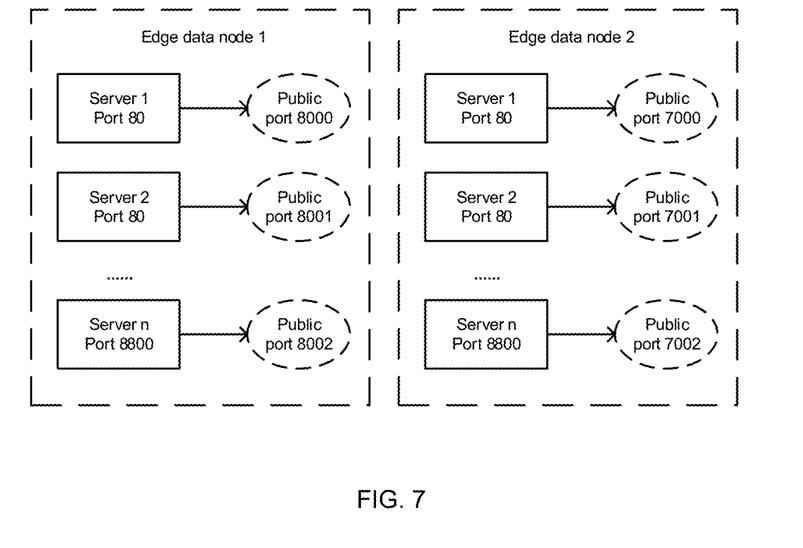
FIG. 7 is a schematic principle diagram of the mapping relationship between the service and the public port in each edge data node in the network architecture of FIG. 3.

In addition, each node can maintain a mapping relationship between a container corresponding to a service and the public port. That is, containers corresponding to servers in nodes are in one-to-one correspondence to the public ports. The mapping relationship between the container corresponding to the service in the node and the public port may be configured by the management center side, or may be configured by the cluster management module on the node side. Since the cluster management modules in different nodes are not related to each other, the port mapping relationships maintained in the nodes are independent. As shown in FIG. 7, each server corresponds to a port, and the port can only be used by the server in the cluster. Specifically, the port to which the container is mapped is called a public port. In this way, different applications (also called services) may use the same port. For example, both server 1 and server 2 in FIG. 7 are configured to call the port 80 in the container, but it may be found from the port mapping relationship that, when the container that provides the server 1 is mapped to a specific public port, the container that provides the server 1 corresponds to port 8000, and the container that provides the server 2 corresponds to port 8001. Moreover, when the container inside the server is migrated, for example, from one server to another server, the change in the IP of the container will be maintained inside the server, and the mapped public port will not change. Therefore, the external does not need to care about the migration of the container. The mapping relationship among the application service, the container, and the public port may be stored in the database of the management center. For example, containers corresponding to different domain names and the mapping relationship with public ports may be saved.

Running module: configured to respond to an edge computing service request initiated by a user by running different containers.

Database cache module: The edge cluster needs to access the database of the central cluster, so layer of cache needs to be added. It then queries the database of the central cluster in the case of no cache hit.

Virtual server cluster module: configured to provide high reliability for the service.

Service request processing module: responsible for the mapping between service ports and public ports, and configured to query, according to the host of the user who initiates the service request (that is, the service port involved in the service request), a mapping relationship between public ports of the module and service ports to search for a public port corresponding to the service request, and send the service request to the located public port.

The practical disclosure of the edge computing network architecture will be described below.

Figure 8:
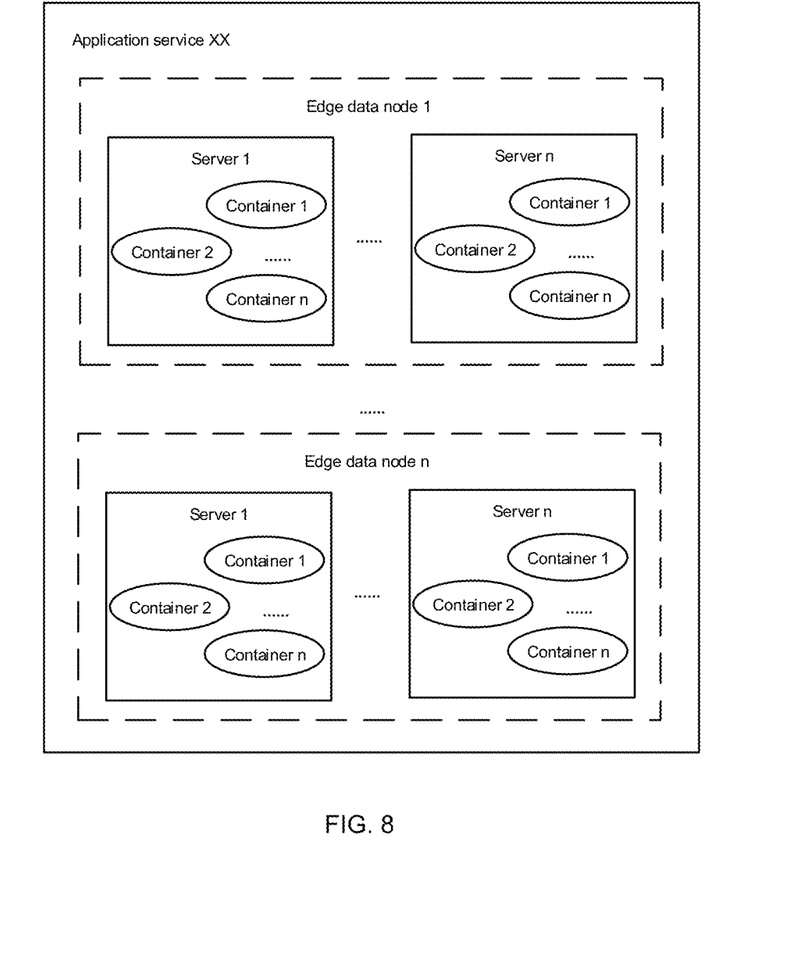
FIG. 8 is a schematic principle diagram of the deployment of services in the network architecture of FIG. 3.
Figure 9:
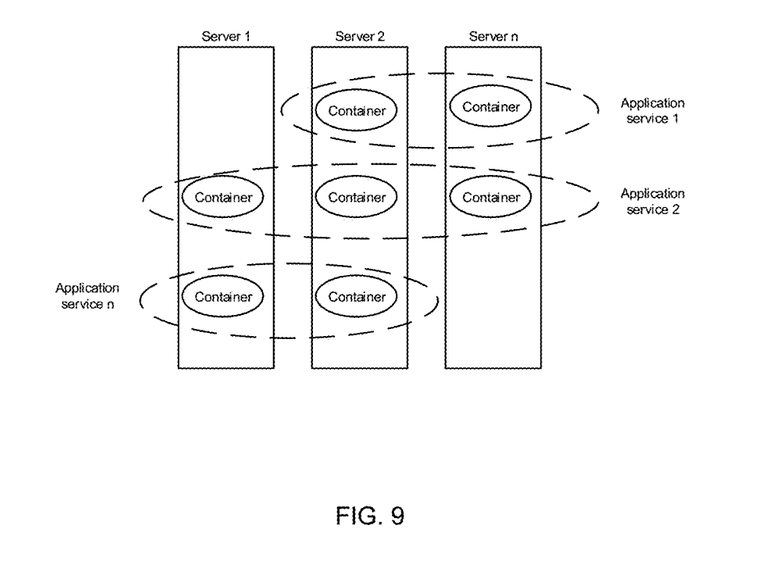
FIG. 9 is a schematic principle diagram of copies on servers in the network architecture of FIG. 3.

First, based on the network architecture, it may be known that the service requested by the user may be provided by servers deployed on multiple nodes, and each server is a collection of a set of containers. The principle is shown in FIG. 8. The number of containers in the same server is called the number of copies of the server. Inside the server, a container with the specified number of copies is guaranteed to be running and the containers that run the same application service may be distributed on different servers, as shown in FIG. 9. In this way, when a user initiates a service request to an edge cluster, load balancing may be performed on the request internally by the server, so that the request is sent to different containers for corresponding processing. This process is transparent to the user, Therefore, for the user, only the server may be seen.

Specifically, the edge data node listens to the service request initiated by the user through the public port, and then the cluster management module routes the request to one or more containers corresponding to the service through the load balancing processing of the cluster. Generally, the request is routed to a container deployed on a server with light loads.

Based on the edge computing network architecture, various types of application services may be created, for example any one or more of disclosure services that support an HTTP request, an HTTPS request, a WebSocket request, an FTP request, an SMTP request, and other request.

This embodiment provides a network edge computing method which, when described from the side of the edge data node, comprises the following operations:

receiving, by an edge data node, a service request initiated by a user; and querying, according to a service port involved in the service request, a mapping relationship between public ports of the edge cluster and service ports to search for a public port corresponding to the service request, and sending the service request to the located public port; and after receiving the service request at the public port of any server in the edge data node, routing, according to a cluster load balancing mechanism, the service request to one or more container corresponding to the service, to be processed by the container.

The service request involved in the present disclosure may comprise an HTTP request, an HTTPS request, a WebSocket request, an FTP request, an SMTP request, etc. The service port involved in the service request may be the port contained in the service request.

Before the edge data node receives the service request initiated by the user, the user may obtain the IP of the edge data node deployed with the service in advance, and then send the service request to the edge data node according to the obtained IP of the edge data node. In practical applications, the user may obtain the IP of the edge data node deployed with the service through the DNS. For example, a user sends a domain name request to the DNS. The DNS queries the pre-stored correspondence between domain names and edge data node information deployed with the service to search for an edge data node closest to the location of the user according to the region of the user who sends the domain name request (that is, the region of the user which is determined by the IP address of the user who initiates the domain name request), and returns the located edge data node information (for example IP address) of the edge data node to the user. The user may use this IP to initiate a service request to the edge data node.

When the network edge computing of the service is implemented based on the method, the service may be generally created in the network edge data node in advance. That is, the management center sends a service create request to the edge cluster. The service create request may comprise container configuration information of the created service. In this case, the edge data node creates a container corresponding to the service on the server in the edge data node, according to the received container configuration information. Then, the edge data node may provide services to the user.

Here, the container configuration information may comprise any one or more of the container deployment location, the number of containers, the container use resource information, and the container image address. In this case, the edge data node may determine which server or servers to create the container according to the container deployment location. According to the container use resource information, a container corresponding to the service may be created on the determined server according to the container use resource information and the container image address. For one server, one or more containers may be created. Therefore, the number of servers on which containers are deployed may be less than or equal to the number of containers.

In addition, when the edge data node creates a container corresponding to the service on the server in the edge data node according to the container configuration information, it may create the container by the pre-configured public port corresponding to the service port. In this embodiment, the pre-configured public port corresponding to the service port may be pre-configured by the management center and issued to the edge data node, or may be autonomously configured by the edge data node, or may be configured by the service provider through an interface. It is not specifically limited in the present disclosure.

As mentioned above, before the user sends a service request to the edge data node, the user may obtain the IP address of the edge data node through the DNS. For example, when the service request initiated by the user is an HTTP request, the correspondence between the HTTP domain names and the edge data node information (that is, the IP address of the edge data node) deployed with the HTTP service is stored in the DNS in advance. The correspondence may be sent by the management center to the DNS. That is, after the edge data node creates the service according to the command from the management center, the management center sends, to the DNS and as configuration information, the correspondence between the domain name of the service provider that initiated the service deploy request and the edge data node information deployed with the service. The DNS stores the correspondence.

This embodiment provides a network edge computation management method which, when described from the side of the management center, comprises the following operations:

The management center receives a service deploy request, and obtains configuration information of the created service according to the service deploy request. The configuration information for the edge computing service comprises at least the specified edge data node information and the container configuration information of the created service. The container configuration information comprises at least the container deployment location, the number of containers, the container use resource information, the container mirror address, etc.

The management center sends a service create request to a specified edge data node according to the configuration information of the service, the service create request containing container configuration information of the container deployed on the specified edge data node.

In an optional embodiment, the management center may save the configuration information of the service after the service is created on the edge data node. In this way, during the subsequent management of the edge data node, the configuration information of the service created on the edge data node may be searched for. The located configuration information of the service may be provided to a trusted third party.

In an optional embodiment, when the management center sends a service create request to the specified edge data node, it may configure a public port corresponding to the service port for the specified edge data node and issue the public port to the specified edge data node. In this embodiment, the configuration of the public port may be set by the management center side, so that in the subsequent management process, the management center may determine which public port or ports are used by the edge data node to provide services.

In an optional embodiment, the management center sends configuration information to the DNS. The configuration information comprises the correspondence between the domain name of the service provider that initiates the service deploy request and the edge data node information deployed with the service, wherein the edge data node information comprises the IP address of the edge data node. In this way, when a user initiates a service request, the DNS may automatically schedule the service request according to the correspondence, to route the service request to a node near the user, without the need for a service provider to provide a scheduling service. Of course, the service provider itself may provide the scheduling service. When the original request from the user is received, the original request may be scheduled to a device of a third-party edge computing service provider near the user for processing.

The following takes actual disclosures as an example to introduce the process of creating a service by an edge data node, initiating a service request to an edge data node by a user, and accessing the service by the edge data node.

This embodiment provides a process for creating a service in an edge computing network. The process mainly comprises the following operations:

S1: The user (the user here is a service provider, which may be referred to as a management user) sends a deploy application request (deploy app) to an application program interface server of a management center;

wherein the deploy application request may contain the type information of the service requested to be deployed (in this example, the HTTP service requested to be created) and the location information (for example node information) of the deployed service.

S2: The application program interface server queries the database of the management center to search for the available public port on the node requesting the deployment service, and allocates an available public port on the edge data node (i.e., on the node) for the service to be deployed, for example, a public port 7000 on node 1.

The available public port is an idle port, or a port not occupied by other services.

S3: The application program interface server sends a create request to the cluster management module of the edge computer room (i.e., the edge data node 1), and the cluster management module is responsible for the specific creation.

The create request sent by the application program interface server contains the public port information allocated for the service, as well as the container configuration information.

S4: The cluster management module selects several servers according to the restrictions of the CPU, memory, etc., and in accordance with the load balancing mechanism for the cluster, and creates a container for running the service on the selected servers.

S5: The application program interface server records the configuration information of the server and the public port corresponding to the domain name in the database.

In the present disclosure, the configuration information of the server comprises at least the deployment location of the server (for example, the node information of the deployment service, that is, the nodes in which the server is deployed), and the container configuration information.

The container configuration information may comprise any one or more of the container deployment location (the server where the container is created), the number of containers (also referred to as the number of copies of the server), the resource use resource information, and the container image address information.

On the basis of the method, the method may further comprise a step S6 of adding the domain name of the customer (that is, the service provider) to the smart DNS. This step is mainly to search, when the DNS receives a domain name request initiated by the user, a node deployed with the service closest to the user according to the IP address of the user who initiates the domain name request, and feed the IP address of the found node back to the user, so that the user uses this IP to initiate a service request that is to be processed by the node.

In addition, in the method steps, when the available public port on the edge data node is allocated to the created service, it is allocated by a disclosure program interface server on the management center side. However, it is just exemplary. In practical disclosures, the edge data node side may autonomously allocate an available public port for the service. After the edge data node allocates a public port corresponding to the service, the public port corresponding to the service may be reported to the management center.

Figure 10:
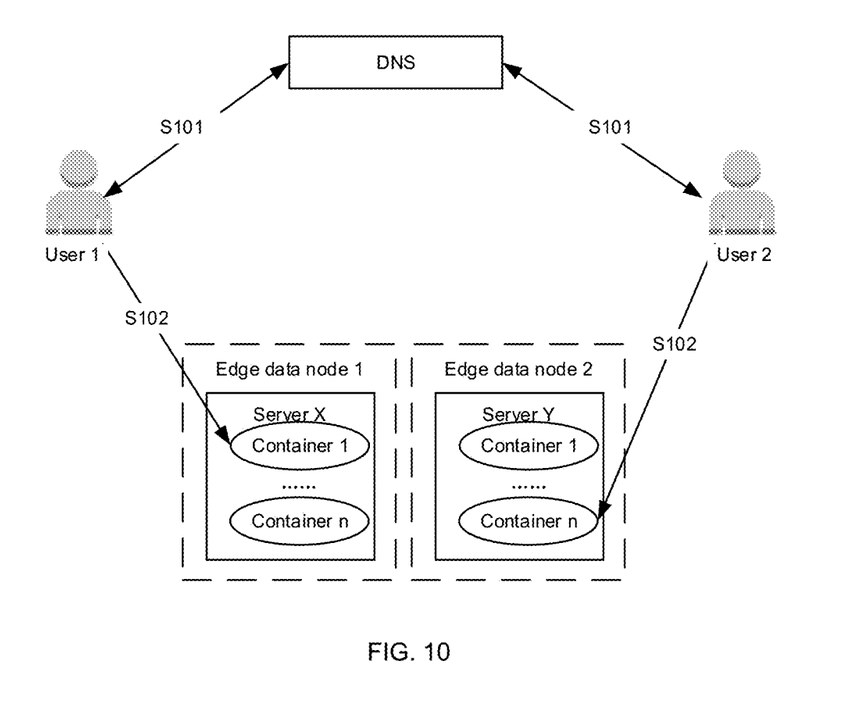
FIG. 10 is a schematic flowchart of a method for realizing a service request according to an exemplary embodiment.

After creating the service as described above, the DNS may receive service requests initiated by users everywhere, and route the user requests to the nearest node for processing. FIG. 10 is a schematic flowchart of a method for initiating a service request in this embodiment. As may be know from FIG. 10, the method mainly comprises the following operations.

S101: The DNS receives a user request, judges the region where the user is located according to the IP address of the user who initiates the request, and returns, to the user, the IP of the edge data node closest to the user.

In this step, the DNS may query the pre-stored correspondence between domain names of the service and edge data node information deployed with the service for the edge data node closest to the location of the user, and return the IP of the located edge data node to the user.

S102: The user uses the IP of the edge data node returned by the DNS to initiate a service request to the edge data node, and the container-group server in the edge data node provides the user with corresponding services.

It may be known from the above description that, in the solution in this embodiment, the scheduling requested by the user is automatically performed by the DNS, and no service provider (for example, an HTTP service provider) is required to provide a scheduling service.

Figure 11:
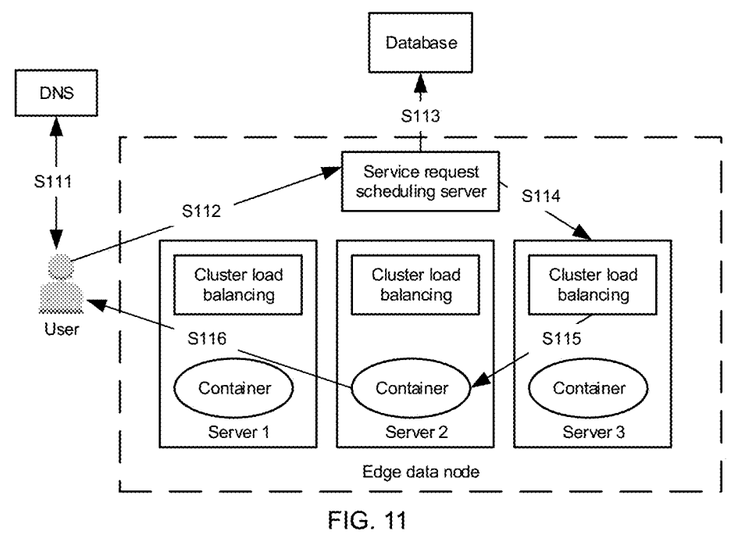
FIG. 11 is a schematic flowchart of a network edge computing method according to an exemplary embodiment.

FIG. 11 is a schematic flowchart of a network edge computing method in this embodiment. The method mainly comprises the following operations:

S111: The user sends a service request to the DNS; and the DNS returns, to the user, the IP of an edge data node whose geographic location or logical location close to the user according to the IP of the user.

For the detailed operation of this step, please refer to the operation of the DNS in the process shown in FIG. 10, which will not be repeated here.

S112: The user sends a service request to the nearby edge data node, and the service request may be sent to the service request scheduling server of the edge data node.

S113: The service request scheduling server searches the database of the management center for the corresponding public port according to the host of the service request sent by the user (that is, the service port contained in the service request), and determines whether the request is legal. If the request is a legal request, the process proceeds to the step S114. If the request is an illegal request, the user is informed of invalid operation or illegal operation. This process ends. Furthermore, the service request scheduling server may select one or more servers among multiple servers with corresponding public ports by load balancing, and forward the service request to the public port.

In other scenarios, the operation of the step S113 may be omitted, so there is no need to access the database of the management center.

S114: The service request scheduling server sends an HTTP request to the public port of the at least one server.

S115: The service request is routed to a certain container in a specified server by the load balancing mechanism for the cluster.

In this step, by the load balancing mechanism for the cluster, the service request may be routed to one or more idle containers corresponding to the service or to any one or more containers.

S116: The container processes the user's request and returns the result to the user.

An embodiment of the present disclosure further provides a computer-readable storage medium having a computer program stored thereon that, when executed, implements steps of the network edge computing method described above. The specific implementation involved in the execution of the computer program has been described in detail in the embodiment of the method, and will not be repeated here.

Figure 12:
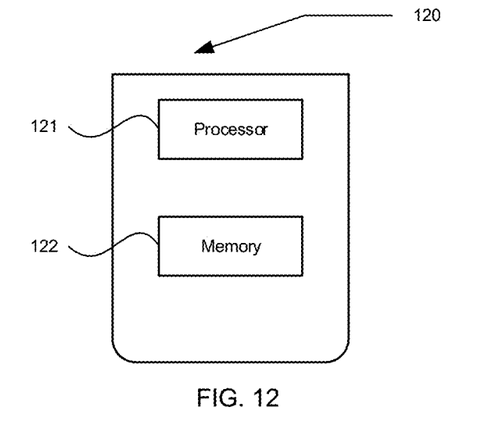
FIG. 12 is a block diagram of a computer device for network edge computation according to an exemplary embodiment.

FIG. 12 is a block diagram of a computer device 120 for network edge computing according to an exemplary embodiment. For example, the computer device 120 may be provided as a server. Referring to FIG. 12, the computer device 120 comprises a processor 121. One or more processors may be provided according to actual needs. The computer device 120 further comprises a memory 122 configured to store instructions executable by the processor 121, for example disclosure programs. One or more memories may be provided according to actual needs. There may be one or more disclosure programs stored in the memory. The processor 121 is configured to execute instructions to perform the network edge computing method described above.

It may be understood by those skilled in the art that the embodiments of the present disclosure may be provided as methods, apparatuses (devices), or computer program products. Therefore, the present disclosure may be in the form of an only hardware embodiment, an only software embodiment, or an embodiment combining software and hardware. Moreover, the present disclosure may be in the form of a computer program product implemented on one or more computer-usable storage media containing computer-usable program codes. The computer storage media comprise volatile and nonvolatile, removable and non-removable media implemented in any method or technology for storing information (for example computer-readable instructions, data structures, program modules, or other data), including but not limited to RAMs, ROMs, EEPROMs, flash memories or other memories, CD-ROMs, digital versatile disks (DVD) or other optical disk storages, magnetic cartridges, magnetic tapes, magnetic disk storages or other magnetic storage devices, or any other media that may be used to store desired information and may be accessed by a computer. In addition, as known to a person of ordinary skill in the art, the communication media usually contain computer-readable instructions, data structures, program modules, or other data in modulated data signals such as carriers or other transmission mechanisms, and may include any information delivery media.

The present disclosure has been described with reference to flowcharts and/or block diagrams of the methods, apparatuses (devices) and computer program products according to embodiments of the present disclosure. It should be understood that each flow and/or block in the flowchart and/or block diagram and the combination of flows and/or blocks in the flowchart and/or block diagram may be implemented by computer program instructions. These computer program instructions may be provided to the processors of general-purpose computers, special-purpose computers, embedded processors, or other programmable data processing devices to produce a machine, so that the instructions executed by the processors of the computers or other programmable data processing devices produce an apparatus that realizes the functions specified in one or more flows in the flowchart and/or one or more blocks in the block diagram.

These computer program instructions may be stored in computer-readable memories that can direct computers or other programmable data processing devices to work in a specific manner, so that the instructions stored in the computer-readable memories produce an article of manufacture including the instruction apparatus. The instruction apparatus implements the functions specified in one or more flows in the flowchart and/or one or more blocks in the block diagram.

These computer program instructions may be loaded on computers or other programmable data processing devices, so that a series of operation steps are executed on the computers or other programmable devices to produce computer-implemented processing. Thus, the instructions executed on the computers or other programmable devices provide steps for implementing the functions specified in one or more flows in the flowchart and/or one or more blocks in the block diagram.

Herein, terms "comprise," "include" and variants thereof are intended to cover non-exclusive inclusion, so that an article or a device including a series of elements not only includes these elements, but also includes other elements not explicitly listed, or further includes inherent elements of the article or the device. Without further limitation, an element as defined by a statement "including a . . . " is not exclusive of additional identical elements in the article or the device of the element.

Although the preferred embodiments of the present disclosure have been described, those skilled in the art can make additional changes and modifications to these embodiments once they learn the basic creative concept. Therefore, the appended claims are intended to be interpreted as comprising the preferred embodiments and all changes and modifications falling into the scope of the present disclosure.

Apparently, those skilled in the art can make various modifications and variations to the present disclosure without departing from the spirit and scope of the present disclosure. In this way, if these modifications and variations of the present disclosure fall into the scope of the claims of the present disclosure and their equivalents, the present disclosure is intended to encompass these modifications and variations.

INDUSTRIAL APPLICABILITY

The present disclosure provides a network edge computing method and apparatus, which provide the edge computing service on edge data nodes in unit of containers. That is, when a service request is received, it is only necessary to route the edge computing service to a container that provides the corresponding edge computing service. When any server fails, it is only necessary to migrate the container on the server to other servers that operate normally, and the corresponding edge computing service can still be provided, without causing the interruption of the service. In addition, in the present disclosure, there may be multiple containers that provide the edge computing service in an edge computing node, which is equivalent to providing the edge computing service in a multiple backup manner. In this way, when any container that provides the edge computing service is overloaded or fails, the corresponding edge computing service can still be provided by other backup containers, thereby ensuring the reliability of the edge computing service. Therefore, the edge computing service can be quickly and efficiently in large-scale complex server clusters.

The invention claimed is:

1. A network edge computing method comprising:
   receiving, by an edge data node, a service request at least processed by network edge computation scheduling; and
   routing, according to a service port involved in the service request, the service request to a container of the edge data node, to be processed by the container, including:

querying a mapping relationship between candidate public ports of the edge data node and candidate service ports to search for a public port corresponding to the service request, and sending the service request to the public port; and after receiving the service request at the public port, routing the service request to the container corresponding to a service according to a load balancing mechanism for the edge data node;

wherein the edge data node maintains a mapping relationship between the container corresponding to the service and the public port.

2. The method according to claim 1, wherein the service request includes at least one of:

an HTTP request, an HTTPS request, a Websocket request, an FTP request, or an SMTP request.

3. A computer-readable storage medium storing a computer program that, when executed, implements the method according to claim 1.

4. A network edge computation scheduling method comprising:

determining, according to a service request, edge data node information of an edge data node corresponding to an initiator of the service request; and returning the edge data node information to the initiator of the service request, to instruct the initiator of the service request to send the service request to the edge data node corresponding to the edge data node information.

5. The method according to claim 4, wherein determining the edge data node information includes:

determining the edge data node information of the edge data node corresponding to the initiator of the service request according to:

a correspondence between domain names and information about edge data nodes deployed with service, and at least one of a geographic location or a logical location of the initiator of the service request.

6. The method according to claim 4, wherein the service request includes at least one of:

an HTTP request, an HTTPS request, a Websocket request, an FTP request, or an SMTP request.

7. A computer-readable storage medium storing a computer program that, when executed, implements the method according to claim 4.

8. A computer device comprising:

a processor; and a memory storing a computer program that, when executed by the processor, causes the processor to:

receive a service request at least processed by network edge computation scheduling; and route, according to a service port involved in the service request, the service request to a container of an edge data node, to be processed by the container, including:

querying a mapping relationship between candidate public ports of the edge data node and candidate service ports to search for a public port corresponding to the service request, and sending the service request to the public port; and after receiving the service request at the public port, routing the service request to the container corresponding to a service according to a load balancing mechanism for the edge data node;

wherein the edge data node maintains a mapping relationship between the container corresponding to the service and the public port.

9. The computer device according to claim 8, wherein the service request includes at least one of:

an HTTP request, an HTTPS request, a Websocket request, an FTP request, or an SMTP request.

10. A computer device comprising:

a processor; and a memory storing a computer program that, when executed by the processor, causes the processor to:

determine, according to a service request, edge data node information of an edge data node corresponding to an initiator of the service request; and return the edge data node information to the initiator of the service request, to instruct the initiator of the service request to send the service request to the edge data node corresponding to the edge data node information.

11. The computer device according to claim 10, wherein the computer program further causes the processor to:

determine the edge data node information of the edge data node corresponding to the initiator of the service request according to:

a correspondence between domain names and information about edge data nodes deployed with service, and at least one of a geographic location or a logical location of the initiator of the service request.

12. The computer device according to claim 10, wherein the service request includes at least one of:

an HTTP request, an HTTPS request, a Websocket request, an FTP request, or an SMTP request.

* * * * *